United States Patent [19]

MacCarthy

[11] Patent Number: 5,475,453
[45] Date of Patent: Dec. 12, 1995

[54] MANUALLY-OPERATED TRAY ASSEMBLY FOR DISPENSING AND RECEIVING OVERHEAD PROJECTOR TRANSPARENCIES

[76] Inventor: Patrick MacCarthy, 5263 Arbutus St., Arvada, Colo. 80002

[21] Appl. No.: 287,370

[22] Filed: Aug. 8, 1994

[51] Int. Cl.$^6$ ................................................ G03B 23/02
[52] U.S. Cl. ........................... 353/103; 353/DIG. 1; 353/DIG. 5
[58] Field of Search .................. 353/DIG. 1, DIG. 5, 353/120, 103, 113

[56] References Cited

U.S. PATENT DOCUMENTS

| | | | |
|---|---|---|---|
| 3,438,703 | 4/1969 | Winnemann | 353/120 |
| 3,524,703 | 8/1970 | Wright | 353/35 |
| 3,536,393 | 10/1970 | Kitch | 353/120 |
| 3,594,082 | 7/1971 | Lonchar | 353/113 |
| 3,600,079 | 8/1971 | Smith et al. | 353/120 |
| 3,609,026 | 9/1971 | Verebay | 353/120 |
| 3,778,143 | 12/1973 | Treher | 353/111 |
| 4,203,659 | 5/1980 | Constantine et al. | 353/120 |
| 4,264,158 | 4/1981 | Lindquist | 353/118 |
| 4,707,092 | 11/1987 | Mindell | 353/109 |
| 4,715,705 | 12/1987 | Nord | 353/120 |
| 4,756,616 | 7/1988 | Min et al. | 353/113 |
| 4,942,411 | 7/1990 | Polston | 353/26 R |
| 4,944,586 | 7/1990 | Rightmyre | 353/108 |
| 5,059,020 | 10/1991 | Genieis | 353/DIG. 5 |
| 5,172,145 | 12/1992 | Stephenson | 353/103 |
| 5,198,846 | 3/1993 | Zilber | 353/113 |

*Primary Examiner*—William A. Cuchlinski, Jr.
*Assistant Examiner*—William C. Dowling

[57] ABSTRACT

A manually-operated tray assembly for facilitating the handling of transparencies on an overhead projector. The tray assembly comprises a dispensing tray for holding a stack of transparencies prior to projection, and a receiving tray for accepting the transparencies following projection. The transparencies are slid one-at-a-time from the dispensing tray to the platen of the projector, and following projection, from the platen to the receiving tray by a stroke of the user's hand. The 'used' transparencies accumulate in the receiving tray in a neat orderly stack. The dispensing tray is preferably arranged at a sloping angle relative to the platen of the projector so that only one transparency at a time is transferred to the platen. The receiving tray is also preferably arranged at a sloping angle relative to the platen to facilitate the transfer of transparencies from the platen to the receiving tray. The dispensing tray and the receiving tray are preferably located on the same side of the projector and are held in suitable positions relative to the projector to accommodate the transfer of transparencies to and from the platen. The user retains complete control over the transparency while it is located on the platen of the projector and may move it about on the platen as desired.

22 Claims, 4 Drawing Sheets

MANUALLY-OPERATED TRAY ASSEMBLY FOR DISPENSING AND RECEIVING OVERHEAD PROJECTOR TRANSPARENCIES

FIELD OF THE INVENTION

This invention relates to the field of projection devices and particularly to accessories therefor. More specifically, this invention pertains to a tray assembly for holding transparencies for an overhead projector, for manually dispensing the transparencies to the projector platen and removing them from the projector platen after projection. The tray assembly holds an initial stack of transparencies in one compartment. The user transfers these transparencies, one at a time, to the platen of the projector for display. After projection, each transparency is transferred from the platen to another compartment where a stack of the 'used' transparencies is formed. Each transparency is transferred from the initial stack to the platen by the user sliding it with his/her hand from the initial stack to the platen of the projector. A similar means is used to transfer each transparency from the platen to the stack of 'used' transparencies. The tray assembly is simple to use and the 'used' transparencies are automatically arranged in an orderly sequence in the receiving tray. The initial stack of transparencies may be directly applied to the tray assembly or the transparencies may be placed in a container or magazine which is then applied to the tray assembly. The tray assembly allows only one transparency at a time to be transferred from the initial stack of transparencies to the platen of the projector.

BACKGROUND OF THE INVENTION

Overhead projectors are in common use in schools, and businesses, and at conferences, and in fact, are used more frequently than slide projectors nowadays. In using an overhead projector the transparency sheets are generally stored in a pile beside the projector, and each sheet is removed from the pile, as needed, and placed on the projector platen; when finished with each sheet, it is removed from the platen and placed in a different pile, and this sequence is then repeated with each successive transparency. This series of steps can sometimes become quite awkward, and transparencies can get mixed up, particularly when the user is preoccupied with the presentation, or not totally at ease during a formal presentation.

A common problem observed in using overhead projectors is that a transparency is inadvertently projected onto a screen in a rotated or inverted configuration, and tiffs is often followed by several attempts at remedying the problem before it is corrected. This can happen, under the pressure of a presentation, even when all transparencies are initially stacked in an orderly arrangement. Frequently, at the end of a presentation, the transparencies are scattered all over a table. On the other hand, it is common to find that the speaker is not provided with sufficient space to properly hold both the initial stack of transparencies and the stack of 'used' transparencies. For example, many overhead projector carts have room only for the projector with no additional space for conveniently holding transparencies during a presentation. As an indication of the discomfort which some individuals feel when using an overhead projector, they sometimes have another person actually 'operate' the projector for them by transferring the transparencies to and from the projector platen as needed.

The prior art contains several devices for dispensing transparencies to overhead projectors. For example, the following patents describe automatic, motor-driven dispensers of transparencies for overhead projectors: U.S. Pat. No. 5,172,145 to Stephenson (1992); U.S. Pat. No. 4,944,586 to Rightmyre (1990); U.S. Pat. No. 4,942,411 to Polston (1990); U.S. Pat. No. 4,756,616 to Min et al. (1988); U.S. Pat. No. 4,707,092 to Mindell (1987); U.S. Pat. No. 4,264,158 to Lindqvist (1981); U.S. Pat. No. 3,778,143 to Treher (1973); and U.S. Pat. No. 3,594,082 to Lonchar (1971). All of those devices are relatively complicated, and are subject to mechanical problems because of the mechanisms involved. The complicated mechanisms in those prior-art devices also make them more expensive. In addition, those devices .require a power supply and are generally quite bulky. Some of these prior-art accessories are considerably more complex than the overhead projectors themselves. The following patents describe dispensers of transparencies for overhead projectors that are manually operated: U.S. Pat. No. 5,198,846 to Zilber (1993); U.S. Pat. No. 4,715,705 to Nord (1987); U.S. Pat. No. 4,203,659 to Constantine et al. (1980); U.S. Pat. No. 3,609,026 to Verebay (1971); U.S. Pat. No. 3,600,079 to Smith etal.(1971); U.S. Pat. No. 3,536,393 to Kitch (1970); U.S. Pat. No. 3,524,703 to Wright (1970); and U.S. Pat. No. 3,438,703 to Winnemann (1969). These prior-art manually-operated devices have several disadvantages. For example, the devices described in U.S. Pat. Nos. 5,198,846 and 4,715,705 are quite bulky and cumbersome; and the devices described in U.S. Pat. Nos. 4,203,659, 3,609,026, 3,600,079, 3,536,393, 3,524,703 and 3,438,703 require that the transparencies be constrained by means of a ring binder. Some of the prior-art devices require that the transparencies have holes punched in them or that they have special flanges, or that the transparencies be mounted in special holders. In addition, many of the manually-operated devices described in these prior-art patents require relatively awkward manipulations during operation of the overhead projector.

Zilber's patent (U.S. Pat. No. 5,198,846) describes a manual cassette system for overhead projection transparencies that includes a storage and dispensing cassette for holding an initial stack of transparencies on one side of an overhead projector and a receptacle on the opposite side of the projector for receiving transparencies following their projection. This device is quite bulky and requires a mounting frame and a container for holding transparencies on two sides of the projector. In addition, the storage and dispensing cassette of U.S. Pat. No. 5,198,846 is relatively complex involving a movable follower plate for supporting transparencies, a biassing means for pushing the follower plate with superposed transparencies upward against the top of the cassette, a movable door interconnected to the follower plate, and a narrow discharge slot through which the transparencies are passed. Thus, this is a multicomponent device requiring the manufacture of several individual components and their assembly into the final product. This makes the device more expensive to manufacture and also affords additional opportunity for malfunction. In addition, the initial stack of transparencies must be inserted through a door at one end of the dispensing cassette which leads to an awkwardness and delay in setting up the device for use. A batch of transparencies cannot be directly removed from the storage cassette, but the door must first be opened and the batch of transparencies removed through that door. Furthermore, individual transparencies may be scratched during transfer to the projector due to contact under pressure with the top of the cassette, and during transfer of transparencies through the discharge slot of the cassette.

DEFINITIONS

Tray assembly—the term tray assembly refers to the combination of two trays -- a dispensing tray and a receiving tray.

Dispensing tray—is deemed as the portion of the tray assembly of the present invention for holding an initial stack of transparencies before they are transferred to the platen of the projector, and from which the transparencies are transferred to the platen.

Receiving tray—is defined as the portion of the tray assembly of the present invention for storing the transparencies after they have been projected. The 'used' transparencies accumulate in the receiving tray in a neat, orderly Easton.

'Used' transparency—this term refers to a transparency that has been projected onto the screen, and that is ready for transfer to the receiving tray or has already been transferred to the receiving tray.

Upward-sloping—the dispensing tray is preferably arranged in an upward-sloping direction, meaning that the transparencies encounter an upward slope as the tray is operated, that is, as the transparencies are slid from the dispensing tray to the platen of the projector.

Downward-sloping—the receiving tray is preferably arranged in a downward-sloping direction, meaning that the transparencies encounter a downward slope as the tray is operated, that is, as the transparencies are slid from the platen of the projector to the receiving tray.

Retaining means—this term is used to describe elements for retaining or holding transparencies on the dispensing tray or receiving tray.

Spacing means—this term is used to describe a way for holding or supporting the tray assembly relative to the platen of the projector so that the dispensing tray and the receiving tray are in suitable spatial positions relative to the platen for the tray assembly to function properly.

SUMMARY OF THE INVENTION

The purpose of this invention is to provide a simple and inexpensive means to facilitate dispensing transparencies on an overhead projector in a manner that keeps all of the transparencies neatly stacked and in order at all times, and allows the 'used' transparencies to accumulate in an orderly and neat fashion while still allowing the user to have immediate access to any of the transparencies at will. The tray assembly has no moving mechanical parts, and is mountable on a single side of the projector thereby making it more compact and less expensive. While providing these advantages, this tray assembly allows the user to retain total control over the transparency while it is on the projector platen as with the conventional method of handling transparencies. For example, when using the tray assembly of the present invention, the user: (i) may move the transparency about on the platen of the projector; (ii) may write on the transparency while it is on the platen; (iii) may partially block off some or all of the transparency from the projection screen by means of an opaque sheet; (iv) may superpose several successive transparencies; (v) may rapidly access any transparency at any time during the presentation; and (vi) may have the individual transparencies interspersed between paper sheets prior to transfer to the platen of the projector. This versatility is generally lost or diminished in prior-art devices for transferring transparencies to overhead projectors.

In using an overhead projector the speaker should generally face the audience during the presentation. However, the ability to face the audience is hindered by the fact that the speaker must be continually shuffling back and forth in transferring transparencies to and from the projector. The present invention allows the overhead projector to be used to its maximum advantage by allowing the speaker to face the audience at all times while transferring transparencies to and from the projector in an inconspicuous manner. If the initial stack of transparencies is properly arranged in using the present invention there is no opportunity for the transparencies to inadvertently become rotated or inverted in the process of transferring them to and from the projector platen. These features of the present invention are conducive to a smoother and more professional presentation.

The primary objective of this invention is to provide an instrument and a method for conveniently and neatly dispensing, transparencies to the platen of an overhead projector and for removing the transparencies from the platen and neatly storing them in an orderly stack. The tray assembly of this invention is an accessory for use in association with an overhead projector, and it may be permanently attached to the projector or it may be demountably attached. The tray assembly may be inbuilt into new overhead projectors. The tray assembly preferably contains two trays, the dispensing tray for holding a stack of transparencies before viewing and from which they are transferred to the platen for projection, and the receiving tray for receiving the transparencies after they are removed from the platen and for holding them in an orderly manner.

Basically, the tray assembly of the present invention works as follows. The stack of transparencies to be used in a presentation is placed on the surface of the dispensing tray positioned at one side (including front or back) of the projector. The uppermost transparency is slid onto the projector platen by placing one or more fingers on the transparency and moving one's hand in a gentle sweeping motion towards the platen surface. Once the transparency is sitting on the platen surface, it can be shifted about or rotated at will, as with the conventional manner of using transparencies. In addition, one may write on the transparency or use an opaque sheet to block off all or part of the transparency, as in the conventional manner of using transparencies. Several transparencies may be superposed on the platen as with the conventional manner of using overhead projectors. Thus, all of the versatility associated with the conventional manner of using transparencies is retained when using the tray assembly of the present invention.

When the user is finished displaying a particular transparency, the transparency is slid off the platen surface into another compartment (the receiving tray). This is accomplished simply by placing one or more fingers on top of the 'used' transparency and sliding the transparency toward the edge of the projector platen so that it slips over the edge of the projector and into the receiving tray. This cycle is then repeated with successive transparencies. The 'used' transparencies accumulate in the receiving tray in an orderly sequence. If the user wishes to return to a 'used' transparency at any time, the stack of 'used' transparencies is removed from the receiving tray and the transparency of interest is chosen. The receiving tray is preferably positioned on the same side of the projector as the dispensing tray, thus making the complete device compact.

The tray assembly can be manufactured in one piece (i.e. unit construction) and there are no moving parts in the tray assembly. In addition, the tray assembly allows a batch of transparencies to be instantly added to the dispensing tray, and the used transparencies can also be instantly removed from the receiving tray. This feature is particularly advantageous during conferences where one speaker must vacate the projector and another speaker mint immediately set up the projector for his/her presentation. The tray assembly allows rapid turnaround by: (i) eliminating the need to gather up piles of transparencies from a table following a presentation; (ii) allowing instant pick-up of the batch of used transparencies from the receiving tray; and, (iii) allowing instant application of a new batch of transparencies to the tray assembly without any complicated set-up.

The initial stack of transparencies may be placed directly on the dispensing tray; alternatively the initial stack may be placed in a magazine which is then placed in or on the dispensing tray. In such a case, a person may have their own personal magazine for storing and transporting transparencies. Such a magazine is compact and can be readily carried in a briefcase without occupying much space. It should be pointed out that the complete tray assembly can be made in a compact form that readily fire in a briefcase. Thus, one could readily transports one's own personal tray assembly. Some embodiments of the present invention actually serve as a carrying case for transparencies as well as a dispensing and receiving tray.

The lack of a complex mechanism for accomplishing the above-described operations is an important feature of this invention from the points of view of convenience, cost, and freedom from breakdown of components. The surface of the dispensing tray containing the initial stack of transparencies may be horizontal or it may be arranged in an upward-sloping manner when mounted on the projector. Similarly, the surface of the receiving tray may be horizontal or arranged at a downward-sloping angle when the tray assembly is mounted on the projector.

Advantages to having the dispensing tray and the receiving tray on the same side of the projector are: (i) the complete tray assembly is more compact and requires a mounting support on only one side the projector; and, (ii) all pans of the tray assembly are in easy reach of the user, and the user does not have to reach over the complete platen during a presentation. The tray assembly may be conveniently mounted on either the left or right side or at the front or back of most common commercial overhead projectors. The tray assembly of the present invention can be mounted on the projector in a manner to accommodate right-handed and left-handed users equally well.

Operating an overhead projector with the tray assembly of the present invention is simple and more convenient than the conventional means of operating a projector. The tray assembly is operated with inconspicuous strokes of a single hand without ever having to actually pick up any of the transparencies. This leads to a more professional presentation. With this invention there is little or no opportunity for projecting improperly oriented or inverted transparencies so long as the initial stack of transparencies is properly arranged.

Operating an overhead projector from a sitting position can be more awkward than when standing. The apparatus of the present invention can be operated with equal ease from both a standing and a sitting position. This feature may be advantageous to individuals who have difficulty in standing for prolonged periods or who have a handicap that prevents them from standing during a presentation. The tray assembly of the present invention may also hold notes for the speaker without occupying additional space.

OBJECTS AND ADVANTAGES OF THE INVENTION

In accordance with the above-presented summary of the invention, and a further description of the invention which will follow, it is the primary object of this invention to provide a manually-operated tray assembly for use in association with an overhead projector, such that a stack of transparencies to be used during a presentation is stored in one tray from which the transparencies can be conveniently transferred, one at a time, to the platen of the projector, from which they can then be conveniently transferred to another tray of the tray assembly, in which they accumulate in an orderly sequence.

Another object of this invention is to provide a tray for use in association with an overhead projector that allows the user to conveniently transfer the transparencies from tiffs tray to the platen of the projector, by means of his/her hand and without the use of any other moving mechanical or electromechanical means.

Another object of this invention is to provide a tray assembly for dispensing and receiving transparencies with an overhead projector that can be manufactured in one piece (i.e. unit construction).

Another object of this invention is to provide a tray assembly for dispensing and receiving transparencies with an overhead projector that is compact and that is mountable on one side of the projector.

Another object of this invention is to provide a method for conveniently transferring transparencies from one stack to the platen of an overhead projector and then to transfer the transparencies neatly from the platen to another stack where the transparencies are automatically arranged in an orderly sequence.

Another object of this invention is to provide a transparency dispensing tray to which a stack of transparencies can be instantly added and from which some or all of the transparencies can be instantly removed.

Another object of this invention is to provide a dispensing tray where gravity is used to prevent all but the uppermost transparency in a stack from being transferred to the platen of a projector.

Another object of this invention is to provide a receiving tray where gravity is used to facilitate transfer of a 'used' transparency to the receiving tray.

Another object of this invention is to provide a device to aid in presentations using an overhead projector where the speaker does not have to actually pick up any of the transparencies during the presentation.

Another object of this invention is to provide an apparatus and a method for using transparencies, in association with an overhead projector, that minimizes or eliminates the opportunity for projecting improperly oriented or inverted transparencies so long as the initial stack of transparencies is properly arranged.

Another object of this invention is to provide a means for conveniently transferring transparencies to and from the platen i of an overhead projector that does not hinder the interaction of the user with the transparency when it is positioned on the projector platen.

Another object of this invention is to provide a manual means for transferring transparencies to and from the platen of an overhead projector, that does not require the presence of punched holes or any other special modification of the transparencies, or that the transparencies be mounted in special frames or holders.

Another object of this invention is to provide an apparatus and method to aid in making more professional presentations using an overhead projector.

Another object of this invention is to provide a method whereby the user of an overhead projector tins immediate access to any of the transparencies on the receiving tray and dispensing tray at all times.

Another object of the present invention is to provide an apparatus for use in association with an overhead projector that maintains the 'used' transparencies and the 'unused' transparencies segregated from each other at all times.

Another object of this invention is to provide a hand-operated apparatus for transferring transparencies to and from an overhead projector that is convenient to operate both from a sitting position and a standing position.

Another object of this invention is to provide a means of facilitating the use of an overhead projector when there is otherwise not sufficient room beside the projector for holding the stacks of initial and 'used' transparencies.

These and other objects and advantages of the present invention will become apparent to those skilled in the art upon reading the details of construction and use as more fully set forth below, reference being made to the accompanying drawings forming a part hereof, wherein like numerals refer to like parts throughout.

| REFERENCE NUMERALS IN DRAWINGS | |
|---|---|
| 1. overhead projector | 2. light box |
| 3. external lens/mirror housing | 4. arm |
| 5. post | 6. platen |
| 7. transparency on platen | 8. focusing knob |
| 9. tray assembly | 10. dispensing tray |
| 11. receiving tray | 12. base of dispensing tray |
| 13. rim on dispensing tray | 14. base of receiving tray |
| 15. side wall of receiving tray | 16. end wall of receiving tray |
| 17. chamber | 18. spacer bar |
| 19. retainer plate for dispensing tray | 19'. retainer plate for receiving tray |
| 20. initial stack of transparencies | 21. stack of 'used' transparencies |
| 22. hole | 23. ribbon |
| 24. intermediate location of transparency | 25. intermediate location of transparency |
| 26. lip | 27. arm |
| 28. slot | 29. bracket |
| 30. cart | 31. support base |
| 32. Velcro ® fastener | 33. support |
| 34. peg | 35. hole |

-continued

REFERENCE NUMERALS IN DRAWINGS 36. plug
38. upper section of side wall 15
40. elevated ridges
42. page of tablet
44. bound end of tablet
46. crease in page of tablet 37. slot in side wall 15
39. lower section of side wall 15
41. slit in base of receiving tray
43. tablet
45. page of tablet (flipped downward)

DESCRIPTION OF THE PRESENTLY PREFERRED EMBODIMENTS

Before the present invention is described in detail in terms of its preferred embodiments, it is to be understood that this invention is not limited to the particular arrangement of parts shown, as such devices may, of course, vary. It is also to be understood that the terminology used herein is for the purpose of describing particular embodiments only, and is not intended to be limiting.

Figure 1A:
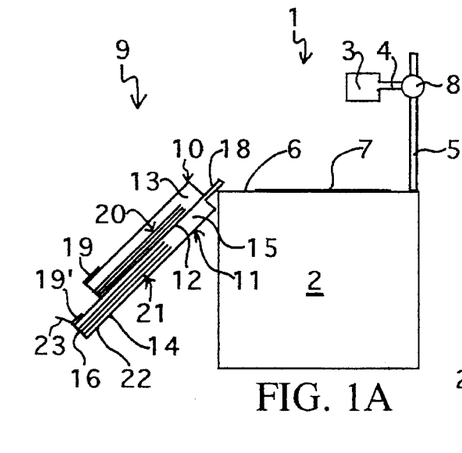
FIG. 1A shows a side-view of one embodiment of the tray assembly of the present invention adjacent an overhead projector.

Referring to FIG. 1A, the overhead projector is designated by the numeral 1. In the drawing of FIG. 1A, the reader is facing the side of the projector 1. The projector 1 is a well-known device in the prior art and consists of a light box 2 that houses a lamp (not shown) and other optical components (not shown). Numeral 3 represents a housing containing an external lens (not shown) and mirror (not shown) for the projector. Housing 3 is held above light box 2 by means of arm 4 slidably mounted on post 5. Post 5 is mounted on light box 2. The flat upper surface of light box 2 contains a transparent window, stage, or platen 6 upon which a transparency 7 (i.e. a transparent sheet having writing, drawings, pictures or other indicia on its surface) is placed. In operation, light from the lamp in light box 2 passes through a lens system and passes upward through platen 6 and transparency 7 sitting on the platen. The light passes into housing 3 where it is redirected and focused on a screen (not shown) positioned at some distance from the projector 1. In this manner, an image of the text, drawings or pictures on transparency 7 is produced on the screen. The distance of housing 3 from the platen 6 of the projector can be varied by rotating knob 8 which causes arm 4 to move up or down the post 5; this allows one to adjust the focus of the image on the screen.

Figure 1B:
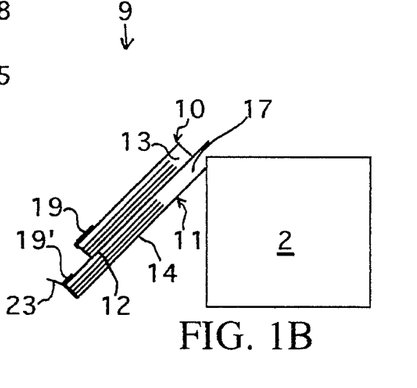
FIG. 1B shows part of the same view as FIG. 1A (only a portion of the projector is shown) but with the side-wall 15 and spacer bar 18 removed from the tray assembly.
Figure 2:
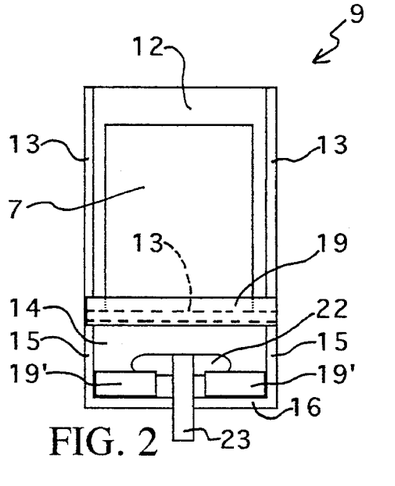
FIG. 2 shows a top view of the tray assembly of FIG. 1A.
Figure 3:
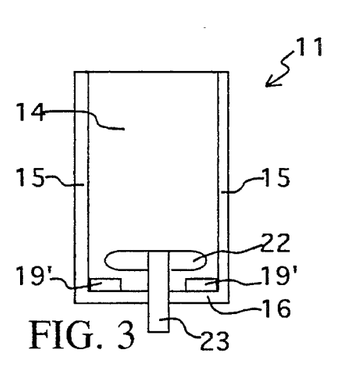
FIG. 3 shows a cut-away top view of the tray assembly of FIG. 1A where the dispensing tray has been removed.
Figure 4:
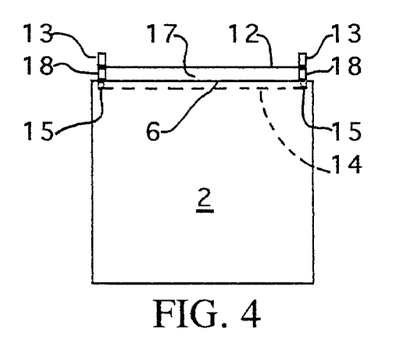
FIG. 4 shows a front view of the tray assembly of FIG. 1A looking in the direction from the platen of the projector toward the tray assembly disposed adjacent the projector.

One modification of the tray assembly 9 of the present invention is illustrated in FIG. 1A, shown adjacent the front of projector 1. The tray assembly 9 includes two trays in combination, the upper or dispensing tray 10 and the lower or receiving tray 11. Dispensing tray 10 includes a plate or base 12 with a rim 13 extending upwards along two sides, and along the end of base 12 that is furthest from the projector as further illustrated in FIG. 2. Part of rim 13 in FIG. 2 is concealed under retainer plate 19 (discussed below) and its position is shown by the broken lines. Receiving tray 11 includes a plate or base 14 with side walls 15 and an end wall 16 at end of base 14 that is furthest from the projector. In the embodiment of FIGS. 1A and 1B, base 12 extends further from the main body of the tray assembly than base 14. Receiving tray 11 is further illustrated in FIG. 3. Base 12 of dispensing tray 10 serves as a ceiling for receiving tray 11 thereby forming a chamber 17 between base 12 and base 14 as illustrated in FIG. 4. FIG. 4 shows a front view of tray assembly 9 of FIG. 1A looking from the projector in the direction of tray assembly 9. For convenience of viewing in the drawings, rim 13 and walls 15 are considered to be transparent, allowing a side-view of the transparencies in FIG. 1A.

Side walls 15 have a panhandle-type shape each with a narrow segment serving as a spacer bar 18 at the end adjacent the projector. Alternatively, side-walls 15 are rectangular and spacer bars 18 are located on the underside of base 12 abutting side-walls 15 and adjacent projector 1. When the tray assembly is mounted on a projector, spacer bars 18 sit on the edge of platen 6 as illustrated in FIGS. 1A and 4. Thus, base 12 of dispensing tray extends above the surface of platen 6 as illustrated in FIG. 1B which shows part of the same drawing as FIG. 1A but with side-wall 15 and spacer bar 18 removed. A spacer bar 18 is shown at each side of tray assembly 9 in FIG. 4. Base 14 of the receiving tray and side-walls 15 would not be visible from the view in FIG. 4, but their positions are shown in outline by the broken lines. In the claims of this patent the term spacing means is used to include the spacer bar 18 or other means to maintain base 12 and base 14 in suitable position relative to platen 6 for proper functioning of the tray assembly.

A transparency that is slid upward on the dispensing tray (i.e. with a general left to right movement in FIG. 1A) will be transferred to platen 6. Sliding a transparency from platen 6 in the opposite direction (i.e. toward the tray assembly 9) causes the transparency to slide under the base 12 of dispensing tray 10 and into chamber 17 of receiving tray 11. The dispensing tray has an optional retainer plate 19 and the receiving tray has an optional retainer plate 19' to help retain the stack of transparencies in each tray. The retainer plates 19 and 19' extend the width or part of the width of the trays, and the transparencies partly enter the area between each retainer plate and the base plate of each tray. The retainer plate is particularly useful in the receiving tray as it prevents the transparencies from slipping or 'jumping' out of the receiving tray immediately after they enter it.

Figure 8A:
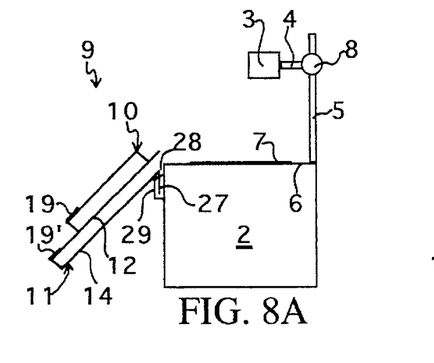
FIG. 8A shows a side-view illustrating one means for mounting the tray assembly on an overhead projector.
Figure 8B:
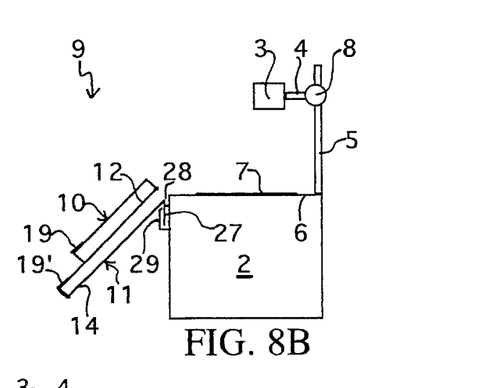
FIG. 8B shows a side-view illustrating the same mounting means as in FIG. 8A but with a slightly different embodiment of the tray assembly.
Figure 9:
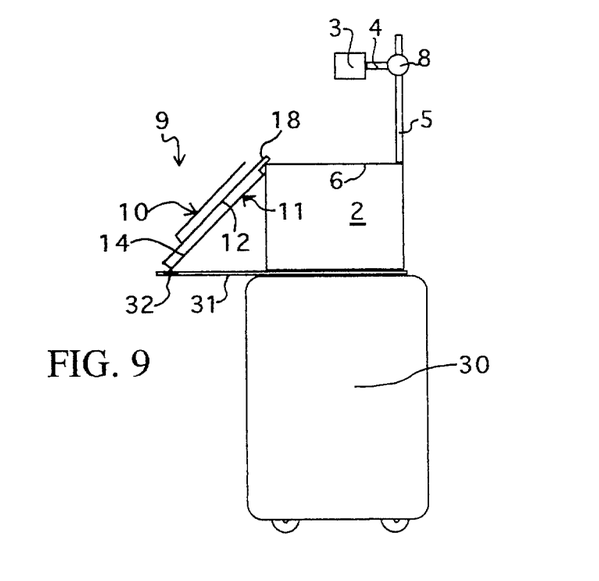
FIG. 9 shows a side-view of an alternative means for mounting the tray assembly on an overhead projector.
Figure 10:
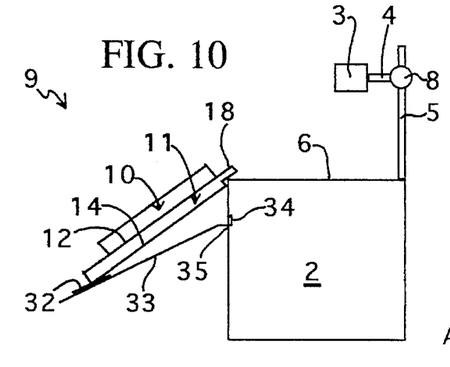
FIG. 10 shows a side-view of an alternative means for mounting the tray assembly on an overhead projector.

The tray assembly 9 can be attached to the light box 2 by any of several conventional methods (not shown in FIG. 1A) such as by means of screws, adhesive, or by means of a mounting bracket. Some of these methods of mounting the tray assembly are discussed later in this specification and are illustrated in FIGS. 8 - 10. Whereas the tray assembly 9 is preferably mounted at the front of projector 1 as illustrated in FIG. 1 A, it may also be mounted at the rear or at either side of the projector.

The tray assembly shown in FIG. 1A is operated as follows. A stack 20 of transparencies is placed on the dispensing tray 10 with one end of the stack under the retainer plate 19. The transparencies are retained on base 12 by rim 13. The transparencies are placed face-up on the dispensing tray so that they will be in the proper position for projection when transferred to the platen; this also allows the presenter to easily read or view the contents of the upper transparency before it is transferred to the platen. The first transparency to be used is placed on the top of the stack with the other transparencies arranged in sequence underneath. The user places one or more fingers on the uppermost transparency (preferably near the end of the transparency closest to the projector) in the stack 20 and, with a gentle sweeping motion of the hand, slides the uppermost transparency upward and to the right (as shown in FIG. 1A) toward and onto the projector platen 6. A transparency 7 that has been transferred to the platen 6 in this manner is shown in FIG. 1A. The upward-sloping arrangement of the dispensing tray 10 in the embodiment of FIG. 1A facilitates the transfer of only a single transparency at a time; the underlying transparencies are retained in the tray by gravity as the upper transparency is moved and are not carried along by frictional drag from the upper transparency. When located on platen 6, the transparency 7 is in position for projection onto a remote screen. While positioned on the platen 6, the transparency 7 may be shifted or rotated as desired.

When finished displaying the transparency 7, the user places a finger on the transparency and, again with a sweeping motion of the hand, slides the transparency in the opposite direction to its original movement, toward receiving tray 11. The transparency encounters the underside of base 12 of the dispensing tray (as best seen in FIG. 1B) and then slides or falls into chamber 17 of receiving tray 11 under the influence of gravity. One end of the transparency slides under retainer plate 19' in receiving tray 11 which prevents the transparency from slipping or 'jumping' out of the receiving tray. The transparencies accumulate in an orderly sequence in receiving tray 11. A stack 21 of transparencies that has been transferred to receiving tray 11 in this manner is shown in FIG. 1A. Because of the downward-sloping arrangement of the receiving tray it is not necessary to push the 'used' transparency all the way into the receiving tray; it need be pushed only part of the way and it then falls or slides the rest of the way into the receiving tray under the influence of gravity.

The vertical positioning of tray assembly 9 with respect to the location of platen 6 of the projector is critical for proper functioning of the tray assembly. For example, if the tray assembly is mounted too low, the transparencies are not properly transferred from the dispensing tray to the platen. If the tray assembly is mounted somewhat higher, but still too low, the transparencies may be transferred to the platen, but when they are slid off the platen back toward the tray assembly they will enter the dispensing tray again rather than the receiving tray. If the tray assembly is mounted too high relative to the platen, the transparencies may be slid from the dispensing tray to the platen, but when slid in the opposite direction they will encounter the underside of base 14 rather than base 12 and will fall to the table or the floor. FIGS. 1A and 1B show the correct positioning of base 12 and base 14 relative to platen 6 for proper functioning of the tray assembly. Spacer bar 18, when resting on platen 6, serves to maintain base 12 and base 14 in proper positions relative to platen 6. It is also important that base 12 does not extend too high above the level of platen 6 so that there is not too much of a 'drop' as the transparency is slid from the dispensing tray to the platen. In testing prototypes of the tray assembly, vertical gaps between the highest point on base 12 of the mounted tray assembly and platen 6 of the projector ranged from about ⅛ inch to about 1 inch and were found to be satisfactory and not to produce awkward 'drops'; even larger gaps would still be acceptable.

In the embodiment of the tray assembly illustrated in FIGS. 1A and 2, transparencies are retained on plate 12 of dispensing tray 10 by means of rim 13 or by a combination of rim 13 and retainer plate 19; in the claims of this patent, the term retaining means embraces rim 13 or the combination of rim 13 and retainer plate 19 when referring to the dispensing tray. In the embodiment of FIGS. 1A, 2, and 3, transparencies are retained on plate 14 of receiving tray 11 by means of walls 15 and 16 or by a combination of walls 15 and 16 and retainer plate 19'; in the claims of this patent, the term retaining means embraces walls 15 and 16 or the combination of walls 15 and 16 and retainer plate 19' when referring to the receiving tray.

During a presentation, it is a simple matter for the user to return to any particular transparency bemuse the 'used' transparencies are neatly stacked in an orderly sequence in the receiving tray 11. It should be noted that the stack of transparencies can be placed directly on plate 12 of dispensing tray 10, and that the transparencies do not have to be mounted into a special cassette or cartridge, or be inserted through a door in the dispensing tray. This allows instant 'loading' of transparencies on the tray assembly. It should also be noted that the dispensing tray does not require the use of additional mechanisms or features such as a follower plate, biassing means, exit slot or mechanical retard means as found in the prior art. Also, there are no moving parts in the tray assembly, and all parts of the tray assembly remain in fixed relative positions during use of the tray assembly.

Various methods may be used to remove stack 21 of 'used' transparencies from receiving tray 11. One way to facilitate removal of a stack of transparencies from receiving tray 11 is to have a hole 22 in base 14 of receiving tray 11 as illustrated in FIGS. 2 and 3. In this case, the user places one hand underneath receiving tray 11 and pushes stack 21 of 'used' transparencies upward by passing one or more fingers through hole 22. The user then grabs stack 21 of 'used' transparencies with the other hand and removes them from the receiving tray. Alternatively, there may be a ribbon 23 at the base of receiving tray 11 and extending from the receiving tray as shown in FIGS. 1A, 2, and 3. Ribbon 23 is connected to the underside of base 11 and passes upward through hole 22. In this case, one simply pulls upward on ribbon 23 and stack 21 of 'used' transparencies is then easily removed from receiving tray 11. Ribbon 23 may also be used without the presence of hole 22. Alternatively, the 'used' transparencies may be removed laterally through optional gaps (not shown) in the side of the receiving tray.

Receiving tray 11 is displaced laterally relative to dispensing tray 10 in FIG. 1A to accommodate the method of removing 'used' transparencies described above. This exposes part of receiving tray 11 as viewed from the top as shown in FIG. 2. It is also possible to make the tray assembly where the receiving tray lies directly underneath the dispensing tray (i.e. without the lateral displacement shown in FIGS. 1A and 2), and to use some other method for removing the stack of transparencies from the receiving tray, such as a door that opens at the bottom or sides of the receiving tray or through a wider hole in base 14 of receiving tray; in such cases, there is no need for a retainer plate 19' on the receiving tray.

In using the tray assembly several successive transparencies can be superposed on the platen to 'build up' a picture as with the conventional manner of using transparencies with an overhead projector (this is generally not possible with the automatic, motor-driven transparency dispensers and with many manual dispensers); when finished with such a set of superposed transparencies, the complete set can be slid into the receiving tray all at once, and they will remain in the order that they would have had if they were viewed separately. Also, a speaker may rapidly and inconspicuously skip over a few transparencies during a presentation, if he/she so desires.

If a speaker wishes to refer back to a used transparency, it is a simple matter to remove the stack of transparencies from the receiving tray and to select the transparency of interest from this stack; the used transparency is then placed on the platen and the remainder of the stack is returned to the receiving tray. If, for some reason, the speaker needs to refer forward to an upcoming transparency, he/she can readily select that transparency from the stack on the dispensing tray and display that transparency out of sequence.

Figure 5:
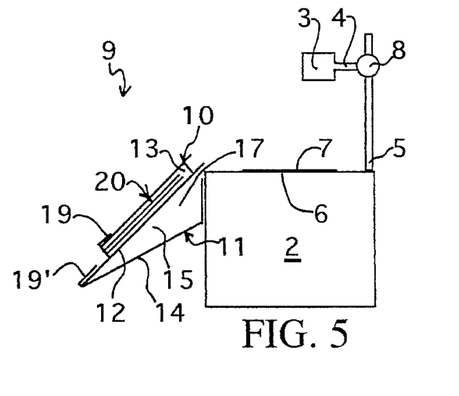
FIG. 5 shows a side-view of another embodiment of the tray assembly of the present invention adjacent an overhead projector.

An alternative embodiment of the tray assembly 9 of the present invention is shown in FIG. 5. Dispensing tray 10 in FIG. 5 is essentially the same as that in FIG. 1A, but the shape of receiving tray 11 is different. When transparency 7 is slid toward receiving tray 11, transparency 7 passes under base 12 of dispensing tray 10 and falls into receiving tray 11. In this case the transparencies fall into place in the receiving tray rather than sliding into place, and thus any potential problem from the transparencies tending to stick together during transfer to the receiving tray are avoided.

There is sometimes a tendency for electrostatic charge to build up on transparencies, and this may cause them to stick together somewhat. Overall, this was found not to be a serious problem when testing prototypes of the present invention. However it can be avoided by plating a metal strip on the dispensing and/or receiving trays adjacent to the overhead projector, or by fabricating the tray assembly in whole or in part out of metal. Such metal components may be electrically connected to a grounded part of the projector; however, in testing prototypes of this invention such grounding was not necessary. There may also be a tendency for transparencies to stick to the tray assembly itself due to electrostatic charge. In particular, transparencies may tend to stick to the 'ceiling' of the receiving tray (i.e. the underside of base 12 of dispensing tray) when entering the receiving tray. If this occurs, the next transparency may enter the receiving tray beneath the preceding transparency, causing the transparencies to accumulate out of sequence in the receiving tray. This problem may be avoided by use of metal conductors as described above, or by use of a receiving tray design as shown in FIG. 5. This problem may also be solved by having a corrugated surface on the ceiling of the receiving tray (i.e. underside of base 12 of dispensing tray 10), with the troughs and ridges preferably parallel to the direction of movement of the transparencies.

Figure 6:
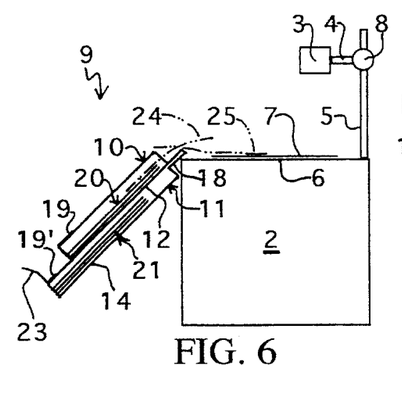
FIG. 6 shows a side-view of the tray assembly adjacent an overhead projector illustrating the partial sequence of events as a transparency is transferred from the dispensing tray to the platen of the projector.

The tray assembly of the present invention is preferably mounted on the projector at a sloping angle as illustrated in FIG. 1A. Advantages to this sloping arrangement are: (i) gravity facilitates the one-at-a-time transfer of transparencies from the dispensing tray to the platen; (ii) transfer of transparencies from the platen to the receiving tray is also facilitated by gravity; (iii) the tray assembly is more easily mounted on the projector; and (iv) the weight of the tray assembly plus the transparencies is more easily borne in the sloping arrangement. The upward-sloping arrangement of the dispensing tray has another advantage also, as illustrated in FIG. 6. As a transparency is slid from an initial stack to the platen of the projector, it moves upward from the dispensing tray and extends above the surface of the platen due to the inherent stiffness of the transparency. Numeral 24 represents the position of the transparency in this situation. Numeral 25, in FIG. 6 represents the position of the transparency a moment later where the transparency has bent downwards onto the platen surface. If more than a single transparency happens to move along under pressure from one's hand, then when the transparencies are in the position represented by numeral 24 in FIG. 6, they can be readily separated from each other by grasping them between one's finger and thumb, and only the upper transparency is then transferred to the platen, and the other transparency (or transparencies) is allowed to fall back into the dispensing tray.

Figure 7:
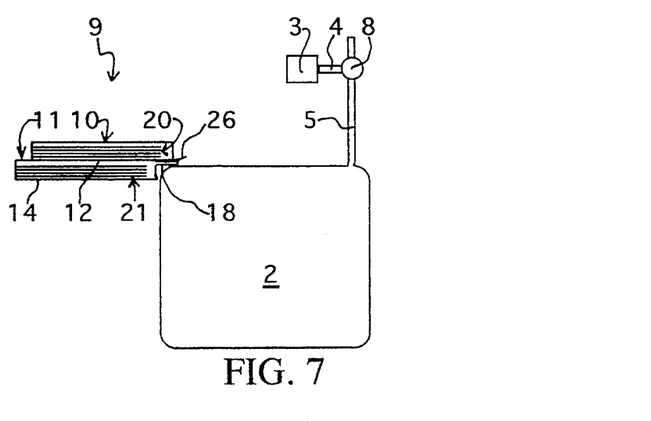
FIG. 7 shows a side-view of another modification of the tray assembly of the present invention adjacent an overhead projector.

The tray assembly may also be mounted in a horizontal configuration as shown in FIG. 7. Tray assembly 9 in FIG. 7 is similar to that in FIG. 1A, consisting of an upper dispensing tray 10 and a lower receiving tray 11. Spacer bars 18 maintain base 12 of dispensing tray above the plane of platen 6 and the base 14 of receiving tray below this plane. Base 12 of dispensing tray 10 has an upwardly extending lip 26 at the end adjacent the projector. Lip 26 hinders movement of the lower transparencies to the platen as the uppermost transparency is slid toward the projector. The surface of lip 26 is preferably made of a material that engages frictionally with the forward-facing edge of the transparencies. For example, the surface of lip 26 may be made of a rubber-like material, or alternatively the surface of lip 26 may be knurled or be slightly corrugated with the troughs and ridges running transverse to the direction of movement of the upper transparency. When the uppermost transparency is slid in the direction of the platen 6, the pressure from one's finger is sufficient to move the transparency against the resistance of upwardly-extending lip 26; however, the resistance due to lip 26 is sufficient to hinder the underlying transparencies from being 'carried along' with the uppermost transparency.

The tray assembly of the present invention could be permanently attached to an overhead projector in various ways, such as by glue, adhesive strips, or by means of screws. Many commercial overhead projectors have holes on their perimeters for attachment of other accessories, such as spools for holding rolls of transparent sheet; these holes could be used for attaching the tray assembly of the present invention. Alternatively, the tray assembly could be made an integral part of the projector during manufacture. It is desirable that the tray assembly be attached to the projector body in a collapsible manner so that the projector-cure-troy assembly is more compact when not in use. This could be accomplished by having a hinge-type connection between the tray assembly and the overhead projector.

Alternatively, the tray assembly may be demountable from the overhead projector and attached only when needed. There are many ways in which the tray assembly could be demountably attached to the projector, one of which is illustrated in FIG. 8A. The tray assembly 9 of FIG. 8A is similar to that shown in FIG. 1A except that it has an arm 27 extending downward underneath base 14 of receiving tray 11. The arm 27 fits snugly into a slot 28 in a bracket 29 that is attached to the side, front, or back of projector 1. This mounting means supports the tray assembly so that base 12 and base 14 are at the proper positions relative to platen 6, that is, a transparency slid from base 12 toward the projector will be transferred to platen 6, and a transparency slid from platen 6 toward the tray assembly will slide under base 12 into receiving tray 11. The bracket 29 may be an integral part of the projector body incorporated during manufacture, or it may be simply connected by means of screws, glue, adhesive tape, or by other means. The connection between arm 27 and the body of the tray assembly may be hinged. Tray assembly 9 of FIG. 5 may be similarly attached to the body of the overhead projector. The embodiment of FIG. 8A, as well as other embodiments, could also be provided in a dismantleable form for convenience of packaging.

FIG. 8B shows a slightly different modification of the tray assembly 9 mounted in a similar way to that in FIG. 8A. In FIG. 8B, base 12 does not extend further from the main body of the tray assembly as in FIG. 1A. Again, in FIG. 8B the mounting means (arm 27 plus slot 28 plus bracket 29)

supports the tray assembly 9 so that base 12 and base 14 are in suitable positions relative to platen 6 for proper functioning of the tray assembly, that is, a transparency slid from base 12 toward the projector will slide onto platen 6, and a transparency slid from platen 6 toward the tray assembly will slide into receiving tray 11.

Another convenient way for mounting the tray assembly is illustrated in FIG. 9 which shows a side-view of a projector 1 sitting on cart 30. A support base 31 of stiff material (e.g. cardboard, hardboard, wood, metal, plastic) is positioned below the projector 1 and held in position by the weight of projector 1. The lower section of tray assembly 9 rests on the support base 31, and the upper section of tray assembly 9, containing the spacer bars 18, rests against the edge of the platen 6 of projector 1. A Velcro® fastener 32, part of which is attached to tray assembly 9 and the other part of which is attached to support base 31, prevents tray assembly 9 from slipping, and maintains tray assembly 9 in proper position for use. This method of mounting the tray assembly is versatile and accommodates the attachment of a given tray assembly to many different commercial overhead projectors without modifying the projectors in any way.

Another method for conveniently attaching the tray assembly to a projector is by means of a peg and hook arrangement as illustrated in FIG. 10. In FIG. 10 support 33 is mounted on the projector by means of pegs 34 which are inserted into holes 35 on the front, side, or back of the overhead projector light box 2. One end of tray assembly 9 is supported on the edge of the light box, by placing spacer bars 18 on the edge of platen 6, and the other end of the tray assembly sits on the support 33 as illustrated. Velcro® fasteners 32 on the bottom of the tray assembly and on support 33 keep the tray assembly in place. Again, this method of mounting the tray assembly is versatile and can be used with many different commercial overhead projectors of different dimensions and contours. In the methods of mounting the tray assembly illustrated in FIGS. 9 and 10, spacer bars 18 serve to maintain the dispensing tray and the receiving tray in a suitable spatial position relative to the platen of the projector for proper functioning of the tray assembly; that is, transparencies slid from the dispensing tray in the direction of the projector slide onto the platen, and transparencies slid from the platen toward the tray assembly slide under the base of dispensing tray and into the receiving tray.

A typical dimension for transparencies is 8.5"×11" although various other dimensions are commonly found. Usually the transparencies are arranged on the platen with the longer dimension extending from front to rear of the platen. However, sometimes it is desirable to position a transparency at right angles to this direction for projection. For certain presentations some of the transparencies may need to be oriented one way and other transparencies may be oriented in the other direction. It is convenient to place all transparencies in the dispensing tray in the same orientation and to simply re-orient them on the platen as necessary. Alternatively, the transparencies may be placed in the dispensing tray in mixed orientations and slid onto the platen in the desired orientation. The dispensing tray and receiving tray can be made sufficiently wide to accommodate both orientations of the transparencies. If the transparencies are placed in the dispensing tray with their longer dimension along the sloping direction of the tray, and if the tray assembly is mounted on the front (as illustrated in FIG. 1A) or rear of the projector, the transparencies are transferred to the platen with the longer dimension of the transparencies extending from front to rear of the platen. If the tray assembly embodiment from FIG. 1A is mounted on either side of the projector (and with the longer dimension of the transparencies along the sloping direction of the tray), then the transparencies are transferred to the platen with their longer dimension extending from side to side of the projector. Once a transparency is located on the platen it may be rotated to any desired orientation. The tray assembly can be made to readily accommodate common US dimensions for transparencies as well as the international A4 page dimension.

Figure 11:
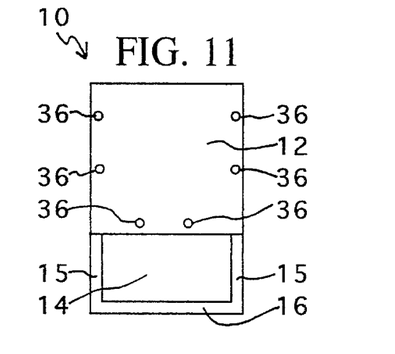
FIG. 11 shows a top view of an alternative embodiment of the dispensing tray of the present invention.

There are many variations of the tray assembly that fall within the scope of the present invention. For example, it is not necessary that the dispensing tray have a continuous rim as illustrated in FIGS. 1A and 2. FIG. 11 shows a variation of the tray assembly of FIGS. 1A and 2 where a set of upwardly-extending plugs 36 rather than a continuous rim is used to contain the stack of transparencies on the dispensing tray 10. Plugs 36 are included in the term retaining means as used in the claims of this patent. Retainer plates 19 or 19' are not shown in FIG. 11.

The tray assembly of the present invention could be sufficiently compact to fit in one's briefcase. In this case, one could arrange the transparencies in the tray assembly in one's home or office, and bring the tray assembly containing the transparencies to the classroom, conference, or other location, similar to what is commonly done with slides in a slide tray. Alternatively, one may have a magazine for holding transparencies that fits into or on the dispensing tray; in this case, one arranges the transparencies in advance in the magazine and simply places the magazine into or on the dispensing tray prior to the presentation, or alteratively removes the transparencies from the storage magazine and places them on the tray assembly.

Figure 12:
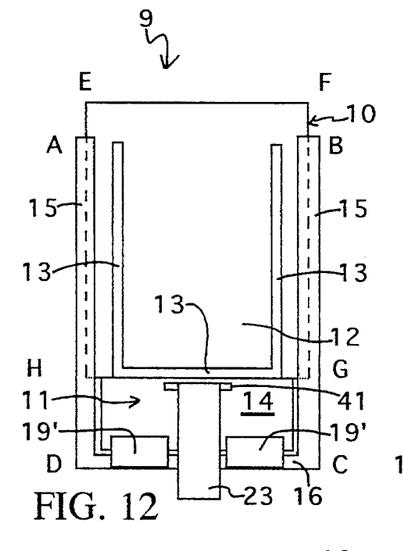
FIG. 12 shows a top view of an alternative embodiment of the tray assembly of the present invention.
Figure 13:
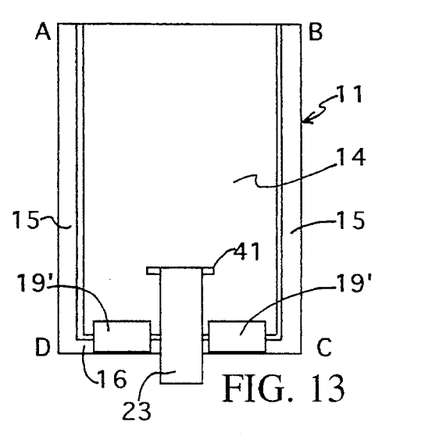
FIG. 13 shows a top view of the receiving tray of FIG. 12.
Figure 14:
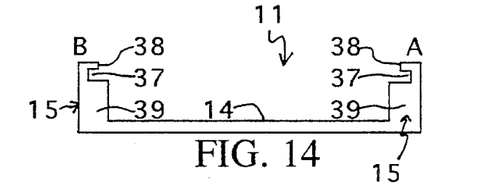
FIG. 14 shows an end view of the receiving tray of FIG. 12 looking from line AB in FIG. 12 toward line CD.
Figure 15:
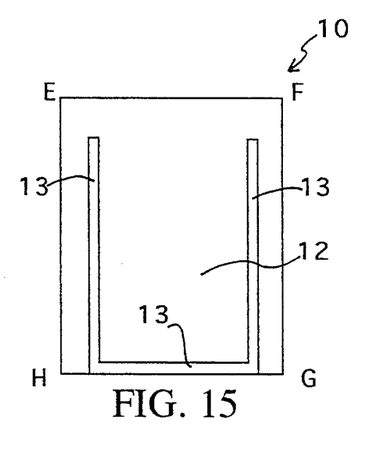
FIG. 15 shows a top view of the dispensing tray of FIG. 12.
Figure 16:
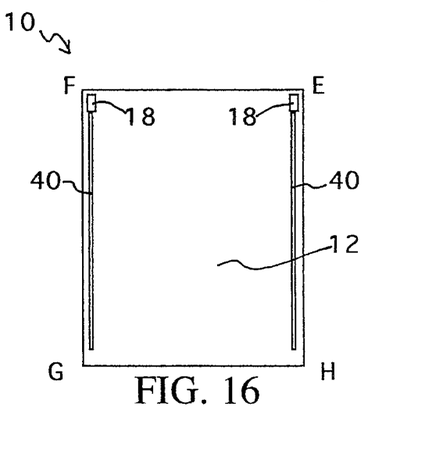
FIG. 16 shows a bottom view of the dispensing tray of FIG. 12.
Figure 17:
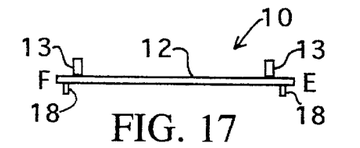
FIG. 17 shows an end view of the dispensing tray of FIG. 12 looking in the direction from line EF toward line HG in FIG. 12.

Another embodiment of the tray assembly is illustrated in FIG. 12 in which the tray assembly is dismantleable into two parts which can be reassembled in a different configuration that serves as a closed storage and carrying case for the transparencies. The tray assembly 9 of FIG. 12 includes two components that are slidably connected together—the receiving tray 11 (FIGS. 13 and 14) and the dispensing tray 10 (FIGS. 15–17). The receiving tray 11 includes a base 14 (ABCD; FIGS. 12–14) with side-walls 15 close to and parallel to two sides (AD and BC), and end wall 16 close to and parallel to end DC of base 14. Walls 15 and 16 have a slot 37 along its full length facing the center of tray 11 as shown in FIG. 14. The upper section 38 of walls 15 and 16 (above slot 37) is narrower than the lower section 39. Dispensing tray 10 includes a base 12 (EFGH; FIGS. 12, 15 and 16) with functional components on both of its faces. On one face there is an elevated rim 13 adjacent three of its sides (EH, HG and GF) as shown in FIG. 15. On its opposite face there are two spacer bars 18 and two elevated ridges 40 as shown if FIG. 16. FIG. 17 shows an end view of dispensing tray 10 facing the end FE.

Figure 18:
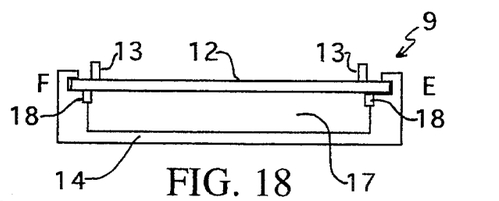
FIG. 18 shows an end view of the assembled tray assembly of FIG. 12 looking in the direction from line EF toward line HG in FIG. 12.

Tray assembly 9 is put together as shown in FIG. 12 for use in association with an overhead projector. End HG of base 12 of dispensing tray 10 is inserted into slot 37 at end AB of receiving tray 11 with the face containing the rim 13 oriented upward. Spacer bars 18 on the underside of base 12 come into contact with the wider section 39 of side-walls 15 at the end AB of base 14, and this prevents the base 12 from entering the receiving tray 11 further than that indicated in FIG. 12. The assembled tray assembly of FIG. 12 is similar to the tray assembly of FIG. 1A and is used in the same way. The elevated ridges 40 on the underside of base 12 prevent the transparencies from getting stuck in slot 37 during entry into the receiving tray 11. FIG. 18 shows an end view of the assembled tray assembly facing the end EF of base 12. Ribbon 23 (FIG. 12) is used for removing the batch of transparencies from receiving tray 11 as already described for other embodiments. In this modification, ribbon 23 extends through slit 41 in base 14 of the receiving tray and is taped to the opposite side of base 14 shown in FIGS. 12 and 13.

Figures 19, 20:
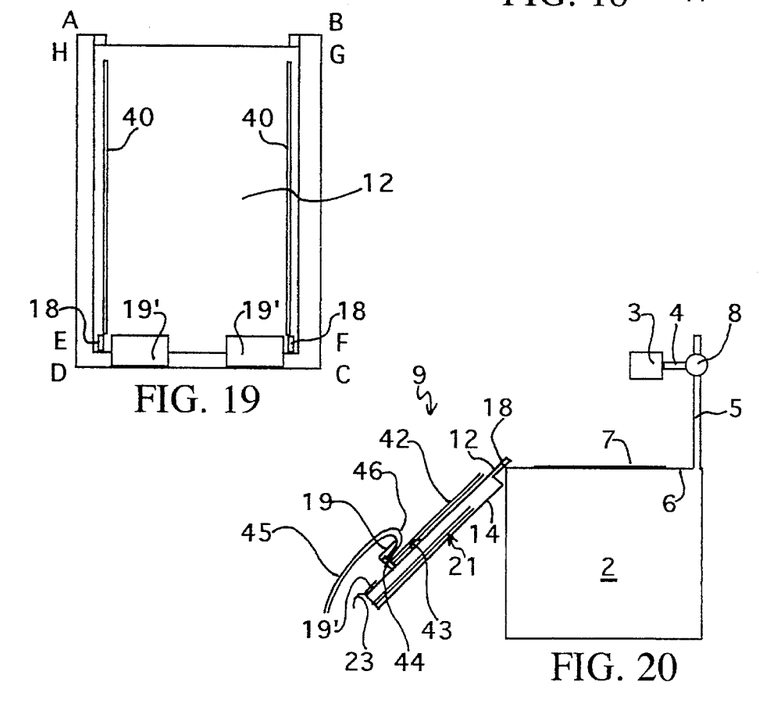
FIG. 19 shows a top view of the device from FIG. 12 assembled in the form of a storage and transportation case.
FIG. 20 shows a side-view illustrating a method of using the tray assembly of the present invention where the transparency sheets are interspersed between the pages of a tablet.

Dispensing tray 10 and receiving tray 11 can be assembled into a form that serves as a storage and transport case as follows. End EF of dispensing tray 10 is inserted into end AB of receiving tray 11 with spacer bars 1 8 and ridges 40 facing upward. In this case, base 12 slides along the full length of slot 37 in side-walls 15, and an enclosure that can be used for storing and transporting transparencies is formed between base 12 and base 14 with walls 15 and 16 of receiving tray 11 providing three of the outer side-walls for this enclosure and section of rim 13 of dispensing tray 10 that is adjacent end HG providing the fourth side-wall for the enclosure. FIG. 19 shows a top view of the device assembled in the form of a storage case.

Other approaches to making a tray assembly that can be rearranged into a storage case are also possible. Some of these include versions where the dispensing tray and the receiving tray are attached to each other by a hinge; in one hinged position the device is in the form of the tray assembly, and in the other position it is in the form of a storage case. Dismantleable versions of the tray assembly also have the advantage of allowing the inner surfaces to be more easily cleaned.

Some speakers like to place their transparencies between paper sheets, allowing the contents of each transparency to be more easily read by the speaker before it is transferred to the platen of the projector. In addition, the speaker may write notes on these paper sheets as 'reminders' of what to say during a presentation. This strategy can also be accommodated by the tray assembly of the present invention. FIG. 20 shows a tray assembly 9 adjacent the front of an overhead projector as in FIG. 1A. The transparencies are placed between the pages 42 of a tablet 43 (e.g. a paper tablet) with the first transparency following page 1 of the tablet, the second transparency following page 2, and so on. The tablet is then placed on the dispensing tray, in an inverted position, as illustrated in FIG. 20, with the bound end 44 of the tablet furthest from the projector. Retainer plate 19, if present, helps to maintain the tablet on the dispensing tray. The first page of the tablet is then flipped downward, to the position indicated by pages 45, to reveal the first transparency which is then transferred to the platen with a stroke of the user's hand as with the previous embodiments. A crease 46 in each page 42 facilitates the downward folding of pages 42. While the first transparency is on the platen the next page of the tablet is then flipped downward to reveal the next transparency. When finished with the first transparency it is transferred to the receiving tray as already described, and the second transparency is transferred to the platen, and this process is continued. Since the pages are part of a bound tablet, they all remain neatly attached to the tablet at all times so that they cannot cause a mess unlike the conventional manner of using an overhead projector with interspersed opaque pages. The tablet pages may preferably be shorter (by, for example, about one inch) than the transparency sheets; this allows some or all of the transparencies to be transferred to the platen of the projector without actually turning over the tablet pages if the user so desires. Also, the tablet pages may be made from a material that can be written upon erasably with erasable markers.

Figure 21:
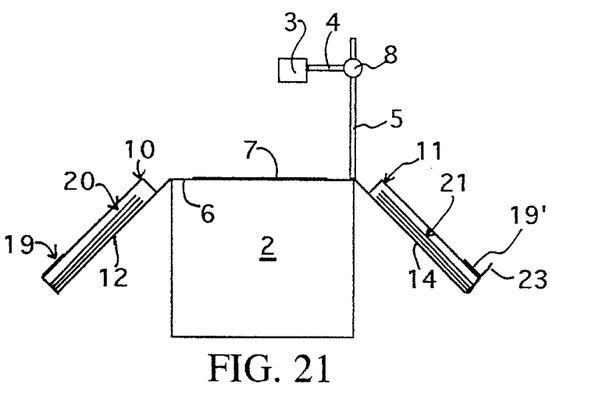
FIG. 21 shows a side-view of an alternative embodiment of the tray assembly of the present invention in association with an overhead projector.

Another modification of the tray assembly 9 of the present invention is illustrated in FIG. 21 where dispensing tray 10 and receiving tray 11 are positioned on opposite sides of projector 1. Dispensing tray 10 is similar to dispensing tray 10 of FIG. 1A and receiving tray 11 is similar to receiving tray 11 of FIG. 1A. Dispensing tray 10 and receiving tray 11 can be attached to the light box 2 by any of several conventional methods (not shown in FIG. 1A). The modification of the tray assembly shown in FIG. 21 is operated in essentially the way manner as the other modifications except that the 'used' transparencies are slid off the platen surface on a side of the projector opposite the dispensing tray.

The tray assembly of the present invention may be made from any of several materials including plastic, metal, wood, or cardboard, or a combination of several materials. The tray assembly may be manufactured in one piece (i.e. unit construction) which reduces the manufacturing cost; alternatively, the tray assembly may be produced in several components which are then assembled into the final form. The combination of dispensing tray and receiving tray may be unitary; alternatively, the dispensing tray and receiving tray may be separate components with the dispensing tray positioned above the receiving tray during use. The tray assembly may be opaque, translucent, or transparent, or it may be partly in each form. The tray assembly preferably should be constructed with rounded edges so as not to scratch the transparencies during their transfer to or from the platen. Parts of the tray assembly may also be lined with a cloth or other covering for this reason. In the embodiments of the tray assembly illustrated, the side walls are parallel; embodiments may also be made where the side walls are not parallel (e.g. the dispensing tray and/or the receiving tray may be trapezoidal) and still fall within the claims of this invention. The section of the receiving tray closest to the projector may be wide to more easily accept the transparencies. If the platen, or the area surrounding the platen of a projector, is not smooth (due, for example, to protruding switches or other features), an auxiliary transparent flat surface may be superposed over the platen, and the tray assembly mounted to this substitute platen. The tray assembly of the present invention works very well with unmounted transparencies; it also works with transparencies that are mounted in special frames. For mounted transparencies the dimensions of the dispensing tray and receiving tray need to be larger than for unmounted transparencies.

It should be pointed out that the system consisting of an overhead projector and the tray assembly of the present invention, and particularly arrangements where the tray assembly is mounted on the front (or rear) are compact and streamlined. The arrangement with the tray assembly mounted on the front of the projector is no wider than the actual overhead projector itself and is particularly suitable for use Of overhead projectors in narrow aisles, a common situation at conferences.

The overhead projector illustrated and described in this specification (e.g. in FIG. 1A) is known as a transmissive type. There are also reflective overhead projectors in which the light bulb is located above the platen (for example, in or near housing 3) and the light is projected onto the platen and reflected from a mirror positioned under the platen surface. Reflective projectors are generally more compact than transmissive models because the large light box 2 is not required in the reflective types. The tray assembly of the present invention is applicable to both transmissive and reflective overhead projectors but the discussion in this specification is presented in terms of the more common transmissive models.

The instant invention is shown and described in what are considered the most practical and preferred embodiments. It is recognized, however, that departures may be made therefrom which are within the scope of this invention, and that obvious modification will occur to one skilled in the art upon reading this disclosure.

I claim:

1. A manually-operated tray assembly for facilitating the handling of transparencies on an overhead projector; the overhead projector including a light source, a platen for holding a transparency, and an optical system for passing light from the light source through a transparency located on the platen and for focusing an image of the illuminated transparency on a remote viewing screen, the tray assembly comprising:

a first tray adjacent an edge of the projector platen;

said first tray including a first plate for holding an initial stack of transparencies prior to their transfer to the platen of the projector;

said first plate having a first face and a second face, with said first face oriented substantially upwards;

a first retaining means on said first race for retaining said initial stack of transparencies on said first plate;

said first plate having a first end defining the region of exit of said transparencies from said first tray when said transparencies are being transferred to the platen from said first tray;

a second tray adjacent the same edge of the projector platen, said second tray attached to and located substantially underneath said first tray;

said second tray including a second plate for holding a final stack of transparencies following their transfer from the platen of the projector;

a second retaining means for retaining said final stack of transparencies in said second tray;

said second plate having a second end deeming the region of entry of said transparencies into said second tray when slid from said platen to said second tray, wherein said first end and said second end are adjacent each other;

said first plate, said second plate and said second retaining means forming an enclosure capable of holding transparencies, said enclosure having a first opening adjacent said first end and said second end through which transparencies can enter said enclosure;

a spacing means for maintaining said first plate and said second plate in proper spatial relationship relative to said platen so that a transparency slid from said first tray toward the projector will slide onto said platen, and a transparency slid from said platen in the direction of the tray assembly will enter said second tray;

mounting means for holding said tray assembly adjacent the projector;

whereby said tray assembly is operated by mounting the tray assembly on one edge of the projector, placing an initial stack of transparencies on said first tray, placing one or more fingers on uppermost transparency in said initial stack of transparencies and sliding said uppermost transparency onto platen of projector, removing said one or more fingers from said transparency, projecting an image of said transparency while it is on said platen, again placing one or more fingers on said transparency and sliding said transparency in the opposite direction to its initial movement, under said first tray and into said second tray, and repeating this set of steps with each transparency in said initial stack of transparencies whereby the transparencies accumulate in an orderly sequence in said second tray.

2. A tray assembly for facilitating the handling of transparencies on an overhead projector as defined in claim 1 wherein said first plate is inclined at an upward-sloping angle to the platen of the projector, whereby said upward-sloping angle of said first plate causes said transparencies to move in a generally upward direction as: they are slid from said first tray to the platen of the projector, and said upward-sloping angle gravitationally hinders the transfer of underlying transparencies when the uppermost transparency is slid from said initial stack of transparencies to said platen.

3. A tray assembly for facilitating the handling of transparencies on an overhead projector as defined in claim 1 wherein said second plate is inclined at a downward-sloping angle to the platen of the projector, whereby said downward-sloping angle of said second plate causes said transparencies to move in a generally downward direction as they are slid from said platen into the second tray, and said downward-sloping angle facilitates by gravity the transfer of transparencies into said second tray.

4. A tray assembly for facilitating the handling of transparencies on an overhead projector as defined in claim 1 wherein said second plate has a third face and a fourth face, with said third face oriented substantially upwards, and wherein said first retaining means comprises an elevated section on said first face, and said second retaining means comprises an elevated section on said third face.

5. A tray assembly for facilitating the handling of transparencies on an overhead projector as defined in claim 1 wherein said first plate and said second plate are connected to each other at a common edge opposite said first opening, and where said second retaining means consists of the junction of said first plate and said second plate at said common edge.

6. A tray assembly for facilitating the handling of transparencies on an overhead projector as defined in claim 1 wherein all pans of said tray assembly remain in fixed spatial relationship during addition of transparencies to said tray assembly, during transfer of transparencies to and from said platen, and during removal of transparencies from said tray assembly.

7. A tray assembly for facilitating the handling of transparencies on an overhead projector as defined in claim 1 wherein:

said first plate has a first edge and a second edge, each edge of said first plate abutting said first end of said first plate;

said first end of said first plate protruding a first predetermined distance from said enclosure further than said second end of said second plate; and, wherein said spacing means comprises an element connected to and extending a second predetermined distance below said second face, said element adjacent said first end of said first plate and also adjacent an edge of said first plate, said element maintaining said first plate and said second plate in proper spatial relationship relative to said platen when said element is sitting on edge of said platen.

8. A tray assembly for facilitating the handling of transparencies on an overhead projector as defined in claim 1 wherein said first end of said first plate includes an upwardly extending lip that offers resistance to transfer of transparencies from said first tray to said platen, whereby all transparencies other than the uppermost transparency remain in said fast tray when the presenter places one or more fingers on said uppermost transparency and slides said uppermost transparency toward the projector platen.

9. A tray assembly for facilitating the handling of transparencies on an overhead projector as defined in claim 1 wherein said fast plate has a third end opposite said first end, and said second plate has a fourth end opposite said second end, wherein said fourth end extends a third predetermined distance beyond said enclosure relative to said third end, thereby producing an opening in said tray assembly adjacent said third end and said fourth end through which transparencies can be removed from said second tray.

10. A tray assembly for facilitating the handling of transparencies on an overhead projector as defined in claim 9, further comprising a removing means for facilitating the removal of transparencies from said second tray.

11. A tray assembly for facilitating the handling of transparencies on an overhead projector as defined in claim 10, wherein said removing means includes a hole in said second plate, said hole adjacent said fourth end, whereby the user places one or more fingers upwards through said hole thereby displacing any transparencies that are located in said second tray.

12. A tray assembly for holding transparencies prior to projection, dispensing transparencies for projection, and receiving transparencies following projection on an overhead projector; the overhead projector including a light source, a platen for holding a transparency, and an optical system for passing light from the light source through a transparency located on the platen and for focusing an image of the illuminated transparency on a remote viewing screen; the tray assembly comprising:

an upper and a lower plate spaced apart and connected to each other by two longitudinal side walls and an end wall, configured to form a chamber with a first opening at one end, said opening opposite said end wall and between said upper and lower plates;

said chamber mounted adjacent an edge of the projector platen and capable of holding a stack of transparencies;

said upper plate having an upward-oriented face with a retaining means for holding a stack of transparencies on said upward-oriented face prior to projection;

a spacing means for holding said chamber in proper spatial relationship relative to said platen so that a transparency slid from said upward-oriented face toward the projector slides onto said platen, and a transparency slid from said platen toward said tray assembly slides into said chamber;

a mounting means for mounting said tray assembly adjacent said platen;

whereby the tray assembly is operated by placing a stack of transparencies on said upward oriented face, placing one or more fingers on uppermost transparency in said stack of transparencies, sliding said uppermost transparency from said upward-oriented face onto said platen, removing said one or more fingers from said transparency, projecting an image of said transparency onto a remote screen, again placing one or more fingers on said transparency, and sliding said transparency from said platen into said chamber, in which the transparencies accumulate in an orderly sequence.

13. A tray assembly for holding transparencies prior to projection, dispensing transparencies for projection, and receiving transparencies following projection on an overhead projector as defined in claim 12 wherein:

said upper plate is arranged at an upward-sloping angle relative to said platen so that transparencies slid from said upper plate toward the projector move in a generally upward direction, and said upward-sloping angle hinders underlying transparencies from being transferred to said platen; and, said lower plate is arranged at a downward-sloping angle relative to said platen so that transparencies slid from said platen into said tray assembly move in a generally downward direction, and said downward-sloping angle facilitates by gravity the transfer of transparencies from said platen into said chamber.

14. A tray assembly for holding transparencies prior to projection, dispensing transparencies for projection, and receiving transparencies following projection on an overhead projector as defined in claim 12 wherein said chamber contains a second opening sufficiently large for removing transparencies from said chamber through said opening, said opening located on said upper plate adjacent said end wall of said chamber.

15. A system for facilitating the handling of transparencies on an overhead projector; the overhead projector including a light source, a platen for holding a transparency, and an optical system for passing light from the light source through a transparency located on the platen and for focusing an image of the illuminated transparency on a remote viewing screen, the system comprising:

a tray adjacent an edge of said platen, said tray capable of holding a stack of transparencies prior to projection;

said tray including a plate, said plate having a first face and a second face, said fast face oriented substantially upwards;

a retaining means on said first face for holding transparencies on said plate, said plate disposed at an upward-sloping angle to said platen of the projector;

a mounting means for holding said tray adjacent an edge of the platen;

whereby said system is operated by placing a stack of transparencies on said tray, placing one or more fingers on uppermost transparency in said stack of transparencies, sliding said uppermost transparency onto said platen, and projecting an image of transparency while located on said platen, and whereby said upward-sloping angle of said tray hinders the movement of underlying transparencies during transfer of said uppermost transparency to said platen.

16. A system for facilitating the handling of transparencies on an overhead projector as defined in claim 15 wherein all parts of said tray remain in fixed spatial relationship during addition of transparencies to said tray and during transfer of transparencies from said tray to said platen of the projector.

17. A method for facilitating the handling of transparencies on an overhead projector comprising the steps of:

applying a stack of transparencies to a first tray adjacent an edge of the projector platen;

placing one or more fingers on uppermost transparency in said stack of transparencies;

sliding said uppermost transparency from said first tray onto the platen of projector; removing said one or more fingers from said transparency;

projecting an image of said transparency while it is located on said platen;

again applying one or more fingers to said transparency while it is located on said platen;

sliding said transparency, in the opposite direction to its initial movement, from the platen onto a second tray that is mounted adjacent the same edge of the projector platen; and, repeating this set of steps with each successive transparency in said stack of transparencies such that the transparencies accumulate in said second tray in an orderly sequence.

18. The method of claim 17 wherein the step of sliding said uppermost transparency from said first tray onto the platen of projector involves movement of said uppermost transparency in a generally upward-sloping direction toward the platen of the projector.

19. The method of claim 17 wherein the step of sliding said transparency, in the opposite direction to its initial movement, from the platen onto a second tray that is mounted adjacent the same edge of the projector platen involves movement of said transparency in a generally downward-sloping direction from the platen into said second tray.

20. The method of claim 17 wherein said transparency can be shifted on the platen surface or rotated about an axis orthogonal to the plane of the platen while said transparency is disposed on said platen.

21. The method of claim 17 wherein the individual transparencies in said stack of transparencies are interspersed between the pages of a tablet bound at one end, and wherein said tablet with interspersed transparencies is placed on said first tray with bound end of said tablet furthest from said platen, and wherein each page of said tablet is flipped downward to expose each successive transparency prior to transfer of each transparency to said platen.

22. A manually-operated tray assembly for facilitating the handling of transparencies on an overhead projector; the overhead projector including a light source, a platen for holding a transparency, and an optical system for passing light from the light source through a transparency located on the platen and for focusing an image of the illuminated transparency on a remote viewing screen, the tray assembly comprising:

a first tray adjacent an edge of the projector platen and positioned such that a transparency located on said first tray and slid in the direction of the projector is transferred to the platen of the projector;

a second tray connected to said first tray and adjacent the same edge of the projector platen and positioned such that a transparency located on said platen and slid in the opposite direction to its initial movement, toward the way assembly, is transferred to said second tray; and support means for holding said first tray and said second tray adjacent the projector;

whereby said tray assembly is operated by placing an initial stack of transparencies on said first tray, placing one or more fingers on uppermost transparency in said initial stack of transparencies and sliding said uppermost transparency onto platen of projector, removing said one or more fingers from said transparency, projecting an image of said transparency while it is on said platen, again placing one or more fingers on said transparency and sliding said transparency, in the opposite direction to its initial movement, onto said second Way, and repeating this set of steps with each transparency in said initial stack of transparencies whereby the transparencies accumulate in an orderly sequence in said second tray.

* * * * *

UNITED STATES PATENT AND TRADEMARK OFFICE
CERTIFICATE OF CORRECTION

PATENT NO. : 5,475,453                            Page 1 of 2
DATED     : Dec. 12, 1995
INVENTOR(S) : Patrick MacCarthy It is certified that error appears in the above-indentified patent and that said Letters Patent is hereby corrected as shown below:

| | | | | |
|---|---|---|---|---|
| Column 1, line 51: | Change | "tiffs" | to | "this" |
| Column 2, line 15: | Change | "devices .require" | to | "devices require" |
| Column 2, line 23: | Change | "Smith etal." | to | "Smith et al." |
| Column 3, line 5: | Change | "troy" | to | "tray" |
| Column 3, line 6: | Change | "deemed" | to | "defined" |
| Column 3, line 15: | Change | "Easton" | to | "fashion" |
| Column 4, lines 17, 18: | Change | "dispensing, transparencies" | to | "dispensing transparencies" |
| Column 5, line 4: | Change | "mint" | to | "must" |
| Column 5, line 21: | Change | "fire" | to | "fits" |
| Column 5, line 40: | Change | "pans" | to | "parts" |
| Column 6, line 16: | Change | "tiffs" | to | "this" |
| Column 6, line 59: | Change | "platen i of an" | to | "platen of an" |
| Column 7, line 5: | Change | "tins" | to | "has" |
| Column 12, line 7: | Change | "bemuse" | to | "because" |
| Column 13, line 22: | Change | "plating" | to | "placing" |
| Column 14, line 36: | Change | "projector-cure-troy" | to | "projector-cum-tray" |
| Column 14, line 64: | Change | "to-that" | to | "to that" |
| Column 18, line 53: | Change | "Of" | to | "of" |
| Column 19, line 22 (Claim 1): | Change | "race" | to | "face" |
| Column 19, line 37 (Claim 1): | Change | "deeming" | to | "defining" |
| Column 20, line 9 (Claim 2): | Change | "as: they" | to | "as they" |

UNITED STATES PATENT AND TRADEMARK OFFICE
CERTIFICATE OF CORRECTION

PATENT NO. : 5,475,453
DATED : Dec. 12, 1995
INVENTOR(S) : Patrick MacCarthy

It is certified that error appears in the above-indentified patent and that said Letters Patent is hereby corrected as shown below:

| | | | | |
|---|---|---|---|---|
| Column 20, line 38 (Claim 6): | Change | "pans" | to | "parts" |
| Column 20, line 67 (Claim 8): | Change | "fast" | to | "first" |
| Column 21, line 5 (Claim 9): | Change | "fast" | to | "first" |
| Column 21, line 52 (Claim 12): | Change | "upward oriented" | to | "upward-oriented" |
| Column 22, line 29 (Claim 15): | Change | "fast" | to | "first" |
| Column 24, line 15 (Claim 22): | Change | "way" | to | "tray" |
| Column 24, line 28 (Claim 22): | Change | "Way" | to | "tray" |

Signed and Sealed this

Twelfth Day of March, 1996

*Attest:*

BRUCE LEHMAN

*Attesting Officer*     *Commissioner of Patents and Trademarks*